(12) United States Patent
Chen et al.

(10) Patent No.: US 11,748,756 B2
(45) Date of Patent: Sep. 5, 2023

(54) SYSTEM AND METHOD FOR FRAUD DETECTION

(71) Applicant: Samsung Electronics Co., Ltd., Suwon-si (KR)

(72) Inventors: Geng Chen, San Jose, CA (US); Pai Peng, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 15/977,742

(22) Filed: May 11, 2018

(65) Prior Publication Data

US 2018/0330382 A1 Nov. 15, 2018

Related U.S. Application Data

(60) Provisional application No. 62/505,745, filed on May 12, 2017.

(51) Int. Cl.
*G06Q 20/40* (2012.01)
*H04L 9/40* (2022.01)
(Continued)

(52) U.S. Cl.
CPC ......... *G06Q 20/4016* (2013.01); *G06F 21/44* (2013.01); *G06Q 20/102* (2013.01);
(Continued)

(58) Field of Classification Search
CPC ............ G06Q 20/4016; G06Q 20/102; G06Q 20/322; G06Q 20/382; H04L 63/08
See application file for complete search history.

(56) References Cited

U.S. PATENT DOCUMENTS 7,730,321 B2 * 6/2010 Gasparini ............. G06F 21/445
713/182
8,073,783 B2 * 12/2011 Felsted ................... G06F 21/41
705/39
(Continued)

FOREIGN PATENT DOCUMENTS

EP 2840541 A2 2/2015
JP 2015/035130 A 2/2015
(Continued)

OTHER PUBLICATIONS

ISA/KR, "International Search Report and Written Opinion of the International Searching Authority," International Application No. PCT/KR2018/005511, dated Aug. 17, 2018, 11 pages.
(Continued)

*Primary Examiner* — Bennett M Sigmond
*Assistant Examiner* — Bhavin D Shah

(57) ABSTRACT

A method for authenticating a counterparty to a digital transaction includes obtaining, at a mobile terminal from a unverified counterparty, characteristic content associated with the digital transaction to be displayed in a trusted user interface provided by the mobile terminal, sending, by the mobile terminal, data associated with the characteristic content to an authentication server; and obtaining, from the authentication server, a result of an authentication judgment by the authentication server, the authentication judgment based on the data associated with the characteristic content and an item of reference content.

30 Claims, 12 Drawing Sheets

(51) Int. Cl.
  *G06Q 20/10* (2012.01)
  *G06Q 20/38* (2012.01)
  *G06Q 20/32* (2012.01)
  *H04W 12/10* (2021.01)
  *H04W 12/06* (2021.01)
  *G06Q 20/12* (2012.01)
  *G06F 21/44* (2013.01)

(52) U.S. Cl.
  CPC ......... *G06Q 20/123* (2013.01); *G06Q 20/322* (2013.01); *G06Q 20/382* (2013.01); *H04L 63/08* (2013.01); *H04L 63/123* (2013.01); *H04W 12/06* (2013.01); *H04W 12/10* (2013.01); *H04L 2463/102* (2013.01)

(56) References Cited

U.S. PATENT DOCUMENTS

| | | | |
|---|---|---|---|
| 8,090,616 B2 | 1/2012 | Proctor, Jr. et al. | |
| 8,571,985 B1 | 10/2013 | Grigg et al. | |
| 8,788,419 B2* | 7/2014 | Samuels | G06F 21/40 705/42 |
| 9,710,691 B1 | 7/2017 | Hatcher et al. | |
| 2004/0098313 A1 | 5/2004 | Agrawal et al. | |
| 2007/0125838 A1* | 6/2007 | Law | G06Q 20/04 235/379 |
| 2007/0215697 A1* | 9/2007 | Ward | G06Q 20/10 235/380 |
| 2009/0119184 A1* | 5/2009 | Mages | G06Q 20/40 705/26.1 |
| 2011/0246369 A1 | 10/2011 | de Oliveira et al. | |
| 2011/0258075 A1 | 10/2011 | Ciurea | |
| 2012/0047072 A1* | 2/2012 | Larkin | G06Q 20/3255 705/44 |
| 2014/0120886 A1* | 5/2014 | Xu | G06Q 30/0641 455/414.1 |
| 2014/0379584 A1* | 12/2014 | Ward | G06Q 20/3829 705/71 |
| 2015/0073987 A1* | 3/2015 | Dutt | H04W 12/12 705/44 |
| 2016/0350742 A1 | 12/2016 | O'Regan et al. | |
| 2016/0364723 A1* | 12/2016 | Reese | G06Q 20/4012 |

FOREIGN PATENT DOCUMENTS

| | | |
|---|---|---|
| JP | 2016-133863 A | 7/2016 |
| KR | 10-1744614 B1 | 6/2017 |

OTHER PUBLICATIONS

Supplementary European Search Report dated Jan. 2, 2020 in connection with European Patent Application No. 18 79 7579, 9 pages.
European Patent Office, "Communication pursuant to Article 94(3) EPC" dated Feb. 3, 2022, in connection with European Patent Application No. 18797579.2, 9 pages.
Summons to attend oral proceedings pursuant to Rule 115(1) EPC dated Dec. 14, 2022 in connection with European Patent Application No. 18797579.2, 8 pages.

* cited by examiner

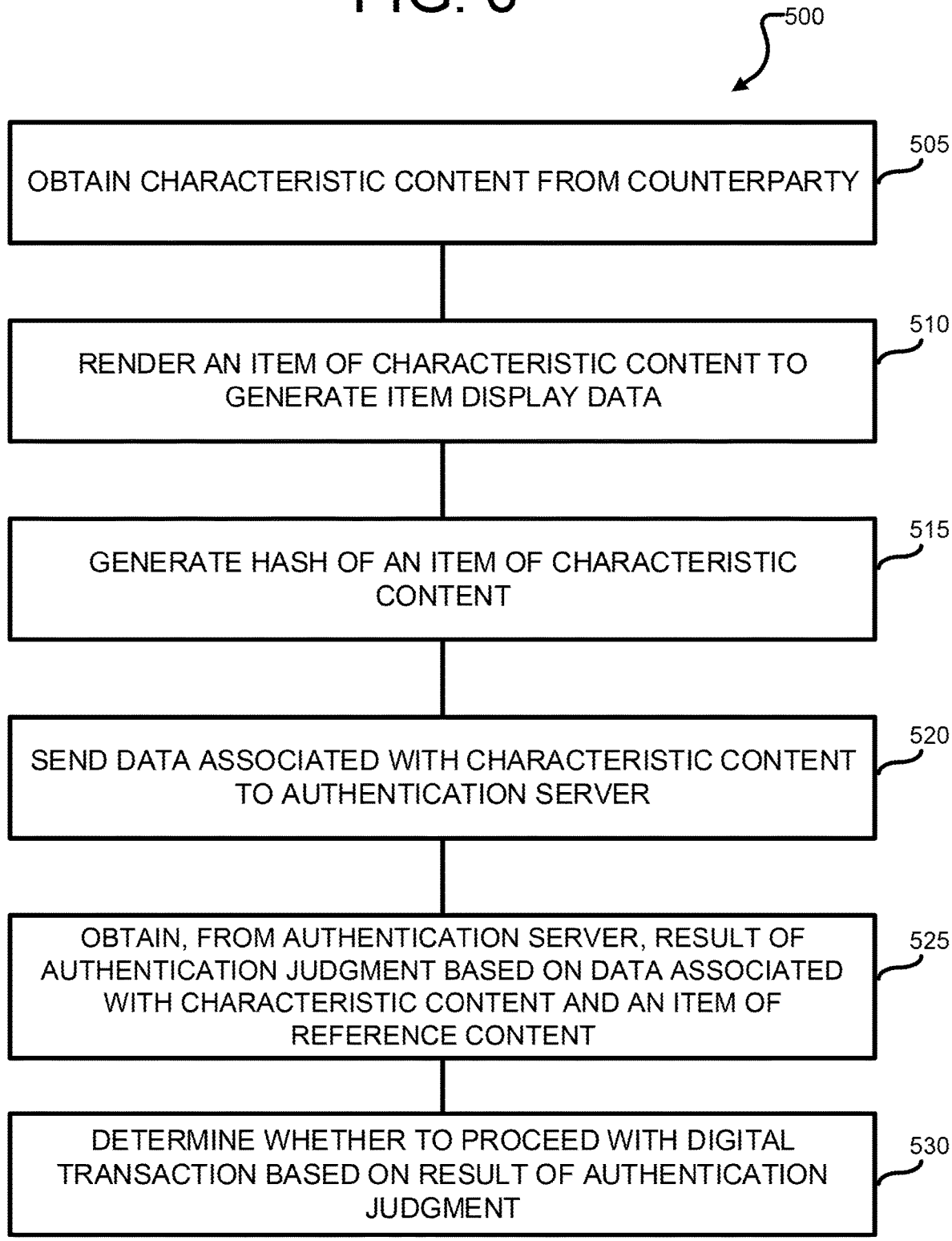

FIG. 8B

```
"secureDatas": [{
    "x_coordinate": 12",
    "y_coordinate":"28",
    "resolution":"2560x1440",
    "density":"10dpi",
    "language":"en_US.UTF-8",
    "countryCode":"US",
    "textARGB":"153,56,56,56",
    "textAlign":"Align.LEFT",
    "textSize":"5.5f",
    "fontName":"Roboto-Medium",
    "fontStyle":"Typeface.NORMAL",
    "backgroundColor":"0",
    "text":Merchant Name | Amount| ECO label
    "textBitmapHash":SHA256(secureTextBitmap)
}, {...}, ...]
```

725 — secureDatas block (x_coordinate through backgroundColor)
730 — "text"
735 — "textBitmapHash"
720 — overall

SYSTEM AND METHOD FOR FRAUD DETECTION

CROSS-REFERENCE TO RELATED APPLICATION AND CLAIM OF PRIORITY

This application claims priority under 35 U.S.C. § 119(e) to U.S. Provisional Patent Application No. 62/505,745 filed on May 12, 2017. The above-identified provisional patent application is hereby incorporated by reference in its entirety.

TECHNICAL FIELD

This disclosure relates generally to payment security. More specifically, this disclosure relates to a system and method for fraud detection.

BACKGROUND

With the increased adoption of digitally executed transactions, such as sales and agreements between users of digital apparatus such as mobile phones and tables and counterparties, the sophistication and imagination of digital fraud by bad actors has likewise increased. For example, in the context of an online payment, payment fraud may still occur when bad actors attempt to misrepresent themselves as a known reputable merchant. Alternatively, payment fraud may occur if a device displays a lower value for a transaction amount, but the data for executing the payment corresponds to a higher value. Numerous variations on counterparty fraud in which one set of transaction parameters are displayed, and another, undisplayed set of transaction parameters are executed are possible, and are difficult to detect, in the absence of any evidence or proof of the transaction parameters displayed to the user. Such improvements in techniques for committing digital fraud present opportunities for improvements in device and network security technology.

SUMMARY

This disclosure provides a system and method for fraud detection.

In a first embodiment, a method for authenticating a counterparty to a digital transaction includes obtaining, at a mobile terminal from a counterparty, characteristic content associated with the digital transaction to be displayed in a trusted user interface provided by the mobile terminal, sending, by the mobile terminal, data associated with the characteristic content to an authentication server; and obtaining, from the authentication server, a result of an authentication judgment by the authentication server, the authentication judgment based on the data associated with the characteristic content and an item of reference content.

In a second embodiment, a method for authenticating a counterparty to a digital transaction includes obtaining, at an authentication server, from a mobile terminal, data associated with characteristic content of a counterparty to be displayed in a trusted user interface provided by the mobile terminal, performing, by the authentication server, an authentication judgment based on the data associated with the characteristic content and an item of reference content to obtain a result, and sending, by the authentication server, the result of the authentication judgment to the mobile terminal.

In a third embodiment, an apparatus includes a display, a network interface, a processor, and a memory. Further, the memory contains instructions, which when executed by the processor, cause the apparatus to obtain, via the network interface, from a counterparty, characteristic content associated with a digital transaction, the characteristic content to be displayed on the display in a trusted user interface provided by the apparatus, send, via the network interface, data associated with the characteristic content to an authentication server, and obtain, via the network interface, from the authentication server, a result of an authentication judgment by the authentication server, the authentication judgment based on the data associated with the characteristic content and an item of reference content.

In a fourth embodiment, an authentication server includes a network interface, a processor and a memory. Further, the memory contains instructions, which when executed by the processor, cause the authentication server to obtain, from a mobile terminal, data associated with characteristic content of a counterparty to be displayed in a trusted user interface provided by the mobile terminal, perform, by the authentication server, an authentication judgment based on the data associated with the characteristic content and an item of reference content to obtain a result, and send the result of the authentication judgment to the mobile terminal.

In a fifth embodiment, a non-transitory computer-readable medium includes program code, which when executed by a processor, causes an apparatus to obtain, via a network interface, from a counterparty, characteristic content associated with a digital transaction, the characteristic content to be displayed on a display in a trusted user interface provided by the apparatus, send, via the network interface, data associated with the characteristic content to an authentication server, and obtain, via the network interface, from the authentication server, a result of an authentication judgment by the authentication server, the authentication judgment based on the data associated with the characteristic content and an item of reference content.

In a sixth embodiment, a non-transitory computer-readable medium includes program code, which when executed by a processor, causes an authentication server to obtain, from a mobile terminal, data associated with characteristic content of a counterparty to be displayed in a trusted user interface provided by the mobile terminal, perform an authentication judgment based on the data associated with the characteristic content and an item of reference content to obtain a result, and send the result of the authentication judgment to the mobile terminal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6 illustrates an example of apparatus-side operations of a method for fraud detection according to various embodiments of this disclosure;

FIG. 8B illustrates an example of data associated with characteristic content as provided in an API call for requesting an authentication judgment from an authentication server, according to certain embodiments of this disclosure.

DETAILED DESCRIPTION

FIGS. 1 through 8B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
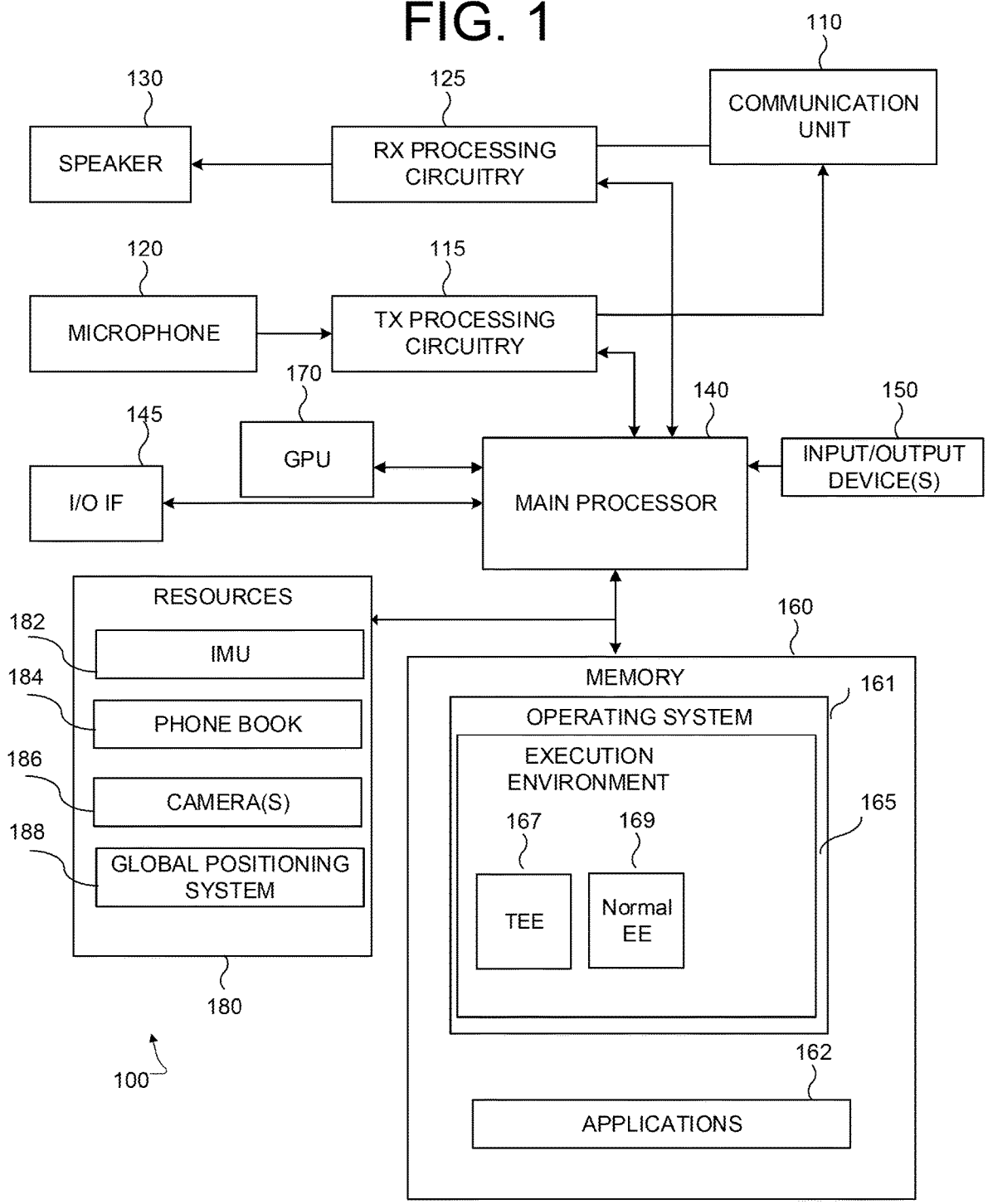
FIG. 1 illustrates an example of an apparatus, such as a mobile terminal, according to certain embodiments of this disclosure.

FIG. 1 illustrates a non-limiting example of a device for implementing fraud detection according to this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to certain embodiments, applications 162 may include an application associated with a counterparty to a digital transaction (for example, a merchant's shopping application. According to some embodiments, applications 162 comprise a mobile wallet application (for example, SAMSUNG PAY, APPLE PAY, GOOGLE PAY, PAYPAL, etc.) providing a secure, or easy payment service from a user's mobile device. Further, applications 162 may include applications containing program code that when executed by a processor, such as main processor 140, cause the processor to perform steps of methods for monitoring suspicious application access according to certain embodiments of the present disclosure.

The communication unit 110 may receive an incoming RF signal, for example, a near field communication signal such as a Bluetooth® or Wi-Fi® signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

Additionally, operating system 161 is capable of providing an execution environment 165 for applications. According to some embodiments, execution environment 165 includes a trusted execution environment ("TEE") 167 (for example TRUSTZONE by ARM) and a normal execution environment 169. According to certain embodiments, certain memory and processor resources accessible in TEE 167 are not accessible to applications running in "normal world" 169. In some embodiments, TEE 167 provides a trusted user interface through which content associated with sensitive device functionalities (for example, payments to be made using a mobile wallet application) can be rendered and displayed for a user.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing fraud detection, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
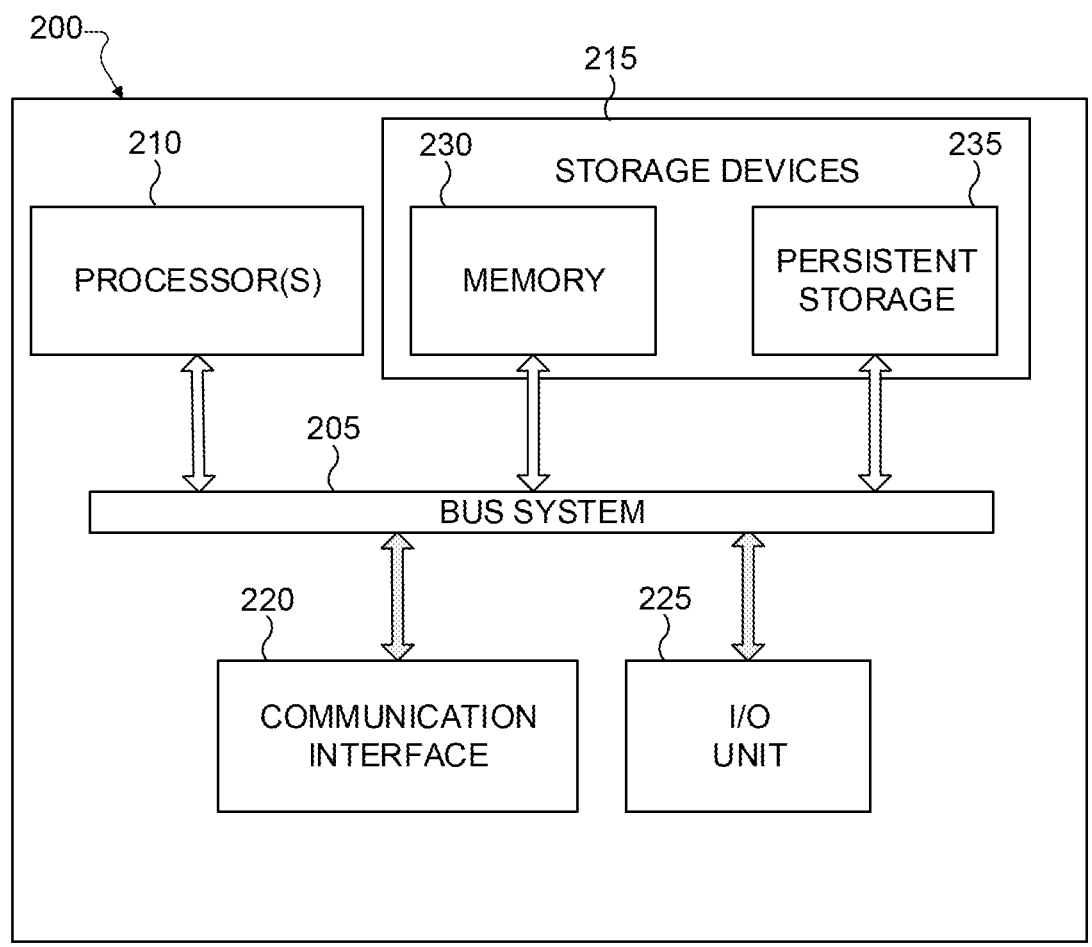
FIG. 2 illustrates an example of an authentication server according to some embodiments of this disclosure.

FIG. 2 illustrates an example of an authentication server 200 according to various embodiments of this disclosure.

Server 200 can, in some embodiments, be embodied on a single standalone device, or on a device providing another server function (for example, a gateway server). Alternatively, in some cases, server 200 may be embodied on multiple machines, for example a server communicatively connected to one or more database servers. According to still further embodiments, authentication server 200 is embodied on a cloud computing platform.

As shown in FIG. 2, authentication server 200 includes a bus system 205 that supports communication between at least one processing device 210, at least one storage device(s) 215, at least one communications unit 220, and at least one input/output (I/O) unit 225.

The processing device 210 executes instructions that can be stored in a memory 230. The processing device 210 can include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term According to certain embodiments, persistent storage 235 comprises one or databases or interfaces to databases embodied on separate machines. storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Figure 3:
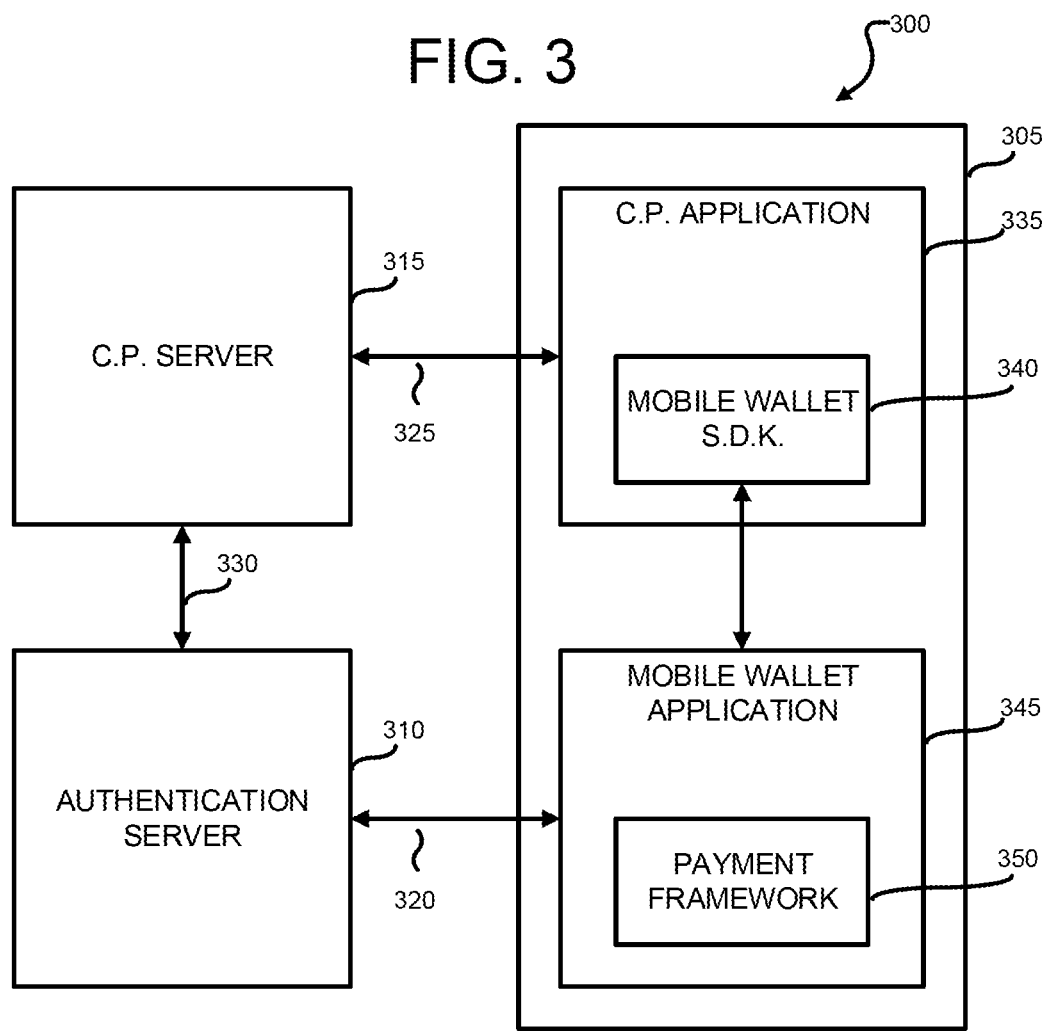
FIG. 3 illustrates an example of a network context for implementing systems and methods according to some embodiments of this disclosure.

FIG. 3 illustrates an example of a network context 300 for implementing systems and methods for fraud detection according to various embodiments of this disclosure.

Referring to the non-limiting example of FIG. 3, network context 300 comprises an apparatus 305 (for example, a mobile terminal, tablet, or other device with a processor, memory and network connection capable of being a party to a digital transaction), authentication server 310 and a counterparty server 315. According to some embodiments, apparatus 305 is communicatively connected to authentication server 310 via network connection 320, and to counterparty server 315 via network connection 325. Additionally, in the non-limiting example of FIG. 3, counterparty server 315 is connected to authentication server 310 via network connection 330. In some embodiments, each of connections 320-330 are direct and may be formed over a single link using a single protocol (for example, Ethernet or Wi-Fi) According to other embodiments, connections 320-330 may be indirect and pass through a variety of networks, switches, and servers from which bad actors can attempt digital fraud by inserting malware or altered characteristic content of a digital transaction into the traffic between apparatus 305 and counterparty server 315.

According to certain embodiments, apparatus 305 comprises a device (for example, device 100 in FIG. 1) capable of running a counterparty application 335 and a mobile wallet application 345.

In the non-limiting example of FIG. 3, counterparty application 335 comprises an application (for example, an e-commerce or shopping application, or a browser) running on apparatus 305, providing an interface by which a user can select the subject matter (for example a good or service to be purchased) and parameters of a digital transaction (for example, a seller, a price, a quantity or a delivery date) of a digital transaction with a counterparty, and initiate the performance of the digital transaction (for example, by purchasing an item for sale, hailing a ride, scheduling performance of a task, subscribing to a recurring service, or otherwise digitally registering transactional intent with a counterparty). According to some embodiments, counterparty application 335 may be provided by the counterparty to the transaction. According to other embodiments, counterparty party application 335 may be provided by a party other than the counterparty to the digital transaction. According to embodiments, counterparty application 335 receives a user's preferences and terms of the digital transaction as inputs entered by the user in response to content presented by counterparty application 335 at a display provided by apparatus 305, and translates the user's inputs into a format (for example, method calls specified by an application programming interface) required by counterparty server 315.

According to various embodiments, counterparty application 335 includes mobile wallet software development kit (SDK) 340. In this non-limiting example, mobile wallet SDK 340 is a software toolkit (for example, the SAMSUNG PAY SDK, the PAYDIENT SDK, the APPLE PAY SDK, the GOOGLE PAY SDK, etc.) which provides a framework (such as classes and code modules to support, for example, an API) by which a functionality can be incorporated into an application. In this example, mobile wallet SDK 340 comprises the toolkit and the portions of counterparty application 335 built with mobile wallet SDK 340 to facilitate the exchange of a store of value (for example, money) mediated by the interaction between counterparty application 335 and counterparty server 315.

In some embodiments, mobile wallet application 345 comprises an application running on apparatus 305, which leverages functionalities (for example, encryption, network connectivity, and multi-layer user authentication) of apparatus 305, such that the mobile device can, like a physical wallet, operate as a store of value for exchange in transactions. According to embodiments, mobile wallet application 345 may run in a separate execution environment, (for example, TEE 167 in FIG. 1) on apparatus 305. In some embodiments, mobile wallet application 345 may support the creation of content (for example, QR codes to be scanned at a point of sale, or a 3DS JSON object to be provided to a third party payer, such as a credit card company) according to predefined standards. Additionally, according to certain embodiments, mobile wallet SDK 340 is used to create or modify counterparty application 335 such that it provides a trusted user interface (TUI), as well as to provide data associated with content presented for display by counterparty application 335 to mobile wallet application 345.

In the non-limiting example of FIG. 3, mobile wallet application 345 comprises payment framework 350. According to various embodiments, payment framework 350 operates to generate encrypted payloads using the public keys of third party payer entities (not shown in FIG. 3) which are provided to counterparty application 335. Additionally, payment framework 350 may support packaging and providing characteristic content and data related to characteristic content of counterparty application 335 to authentication server 310.

In at least one embodiment according to this disclosure, counterparty server 315 comprises a server which registers the counterparty's transactional parameters (e.g., the counterparty's business name, what items are available for sale, prices, and quantities) and provides content (for example, XML data) representing these transactional parameters to counterparty application 335 for display on apparatus 305. Further, counterparty server 315 hosts and serves content which can be said to be characteristic of a digital transaction (for example, the counterparty's ID, image, or price, quantity or other data to be rendered at apparatus 305) shown prior to receiving an input from a user to proceed with a digital transaction.

According to certain embodiments, authentication server 310 is a server machine (for example, authentication server 200 in FIG. 2), which receives from apparatus 305 data associated with characteristic content for display through counterparty application 335. In the non-limiting example of FIG. 3, data associated with characteristic content includes, without limitation, a relevant image (for example, a logo), a hash of a relevant image, or rendered alphanumeric characters (for example, a price or quantity as it appears on a display of apparatus 305. Further, in the non-limiting example of FIG. 3, authentication server 310 includes a memory containing program code, which when executed by a processor, causes the authentication server to perform an authentication judgement based on data associated with the characteristic content and an item of reference content to obtain a result. For example, authentication server 310 may, in some embodiments, receive an image file of a logo presented in a checkout screen by counterparty application 335, generate a hash (for example, an SHA256 hash or any other hashing algorithm) of the image file of the logo, and compare the generated hash against an item of reference content stored in the authentication server, to determine whether the hashes match. Cases where a bad actor has attempted to recreate the data of a trusted counterparty can be identified through non-matches against items of reference content, such as hash values of characteristic content. In the non-limiting example of FIG. 3, authentication server 310 sends the result of the authentication judgment to mobile wallet application 345.

FIG. 3 provides one example of a network context 300 in which embodiments of systems and methods for fraud detection according to this disclosure may be implemented. Other embodiments, including network contexts, wherein apparatus 305, authentication server 310, and counterparty server 315 are connected indirectly, such as through additional servers and processing entities (for example, a payment gateway server, a payment network, or an issuer (e.g., third party payer) server) are possible and within the scope of this disclosure. Similarly, while FIG. 3 has been described principally in the context of e-commerce and preventing fraudulent acquisition of payment information, the systems and methods for fraud detection according to this disclosure are equally applicable to preventing unauthorized acquisition of other types of sensitive information through fraudulent manipulation of characteristic content as displayed to the user of an apparatus.

Figure 4:
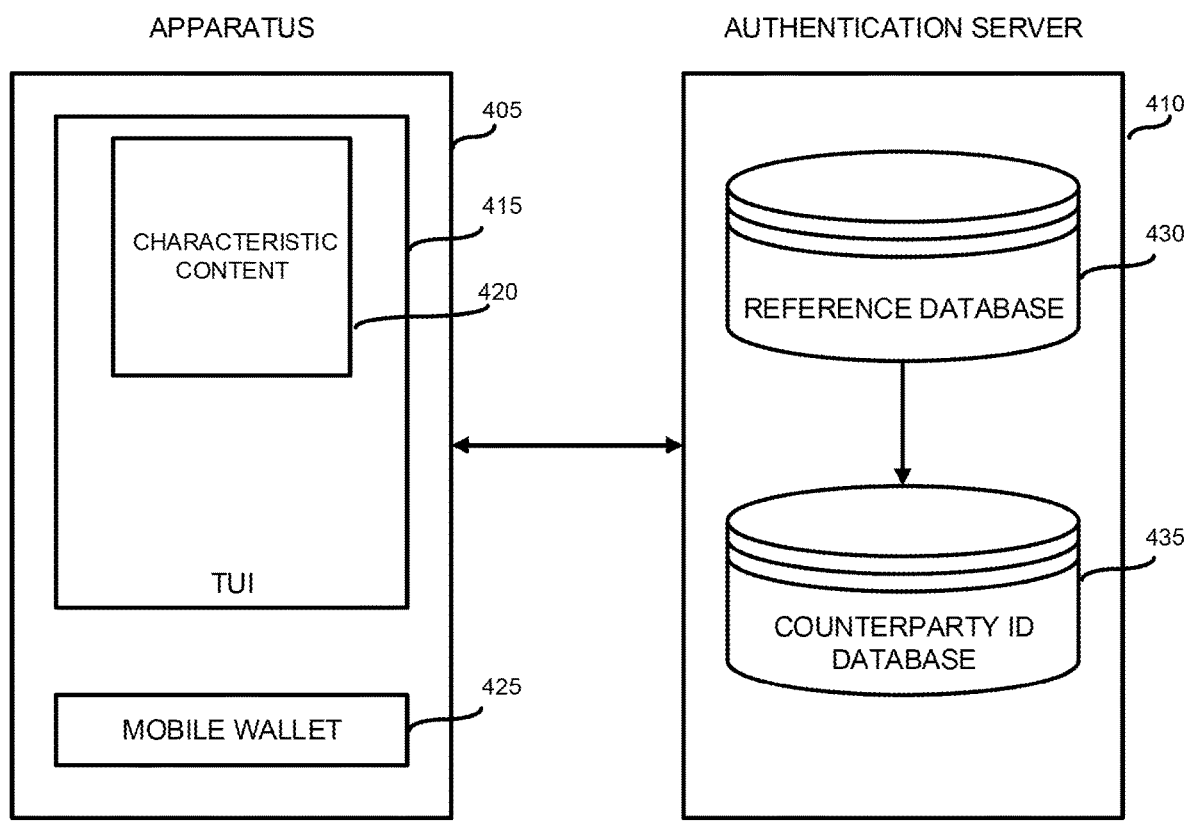
FIG. 4 illustrates an example of an apparatus and authentication server according to certain embodiments of this disclosure.

FIG. 4 illustrates an example of an apparatus 405 communicatively connected (for example, via network interfaces) to an authentication server 410 according to various embodiments of the present disclosure.

Referring to the non-limiting example of FIG. 4, apparatus 405 comprises a display, on which a trusted user interface (TUI) 415 displays content associated with a counterparty application (for example, counterparty application 335 in FIG. 3). According to certain embodiments, TUI is executed in a trusted execution environment on apparatus 405, and presents content requiring a user authentication (for example, content associated with payment or fulfillment of a digital transaction).

According to certain embodiments, the content displayed in TUI 415 includes characteristic content 420, which comprises content upon which a user relies in deciding whether to proceed with a digital transaction by using a sensitive resource of apparatus 405. In the non-limiting example of FIG. 4, the digital transaction is a monetary transfer (for example, payment for an e-commerce transaction), and the sensitive resource of apparatus 405 comprises mobile wallet 425.

According to embodiments, prior to receiving an input from a user instructing the apparatus to proceed with a digital transaction with a counterparty (also known herein as a merchant), a process (for example, a process of a mobile wallet application, such as mobile wallet application 345 in FIG. 3) executing on apparatus 405 obtains data associated with characteristic content associated with the digital transaction that is to be displayed in TUI 415. Characteristic content includes, without limitation, an image (for example, a logo), a counterparty ID, or a transaction amount. Characteristic content may be received at apparatus 405 in a format ready for display without further processing (for example, as an image file), or in a format requiring rendering at apparatus 405 according to the display settings of the device. According to certain embodiments, data associated with characteristic content comprises, without limitation, characteristic content itself, snapshots of characteristic content as rendered for display in TUI 415, hashes of characteristic content (such as an image or a logo), hashes of snapshots of characteristic content as rendered for display, as well as normalization data associated with the display of characteristic content in TUI 415. In the non-limiting example of FIG. 4, normalization data includes, without limitation, data identifying the model number or type of apparatus 405, data identifying the operating system and version (for example, operating system 161 in FIG. 1) running on apparatus 405, system information (e.g., accessibility settings, text size, etc.), or screen information (e.g., resolution, brightness, etc.). In the non-limiting example of FIG. 4, system information which can be normalizing data includes, without limitation, data indicating whether an accessibility mode is enabled at an apparatus, or whether a "night mode" (such as a mode causing content to be displayed with an amber tint) is enabled. According to embodiments, system information which may be normalizing data includes, without limitation, data indicating a screen type, or a pixel density of a display of an apparatus.

In the non-limiting example of FIG. 4, authentication server 410 comprises one or more server machines which can perform an authentication judgment, which in some embodiments, comprises an examination of the characteristic content 420 displayed at apparatus 405 against trusted reference examples of characteristic content maintained at authentication server 410. According to certain embodiments, authentication server 410 checks for minute, pixel-level discrepancies in characteristic content as presented for display at apparatus 405 from expected values.

According to embodiments, authentication server 410 comprises at least the following two data stores, reference database 430 and counterparty ID database 435. In the non-limiting example of FIG. 4, reference database 430 and counterparty ID database 435 comprise separate relational databases. According to other embodiments, the data provided by reference database 430 and counterparty ID database 435 may be stored in one or more columnar databases.

According to various embodiments, reference database 430 comprises a store of items of reference content comprising or representing authentic characteristic content. According to certain embodiments, items of reference content comprise hashes of authentic characteristic content. In some embodiments, authentic characteristic content may be provided from counterparties as part of a registration or onboarding procedure with authentication server 410. For example, authentication server 410 may offer a registration, or onboarding, service for providers of counterparty applications to be included in reference database 430 and counterparty ID database 435. In the non-limiting example of FIG. 4, registration comprises obtaining a certificate from a provider of a counterparty application providing the counterparty's ID, and one or more items of authentic characteristic content from the counterparty application. In such cases, authentication server 410 may create an item of reference content by generating a hash of a received item of characteristic content, and create an association (such as a relationship in a .SQL database) between the item of reference content and the counterparty ID. In this non-limiting example, authentication server 410 adds the reference database 430 and the counterparty ID to counterparty ID database 435. According to certain embodiments, normalization data (for example, screen settings and screen sizes) may be stored in reference database 430, so that multiple reference items of content, (including, without limitation hashes of characteristic content), accounting for variations in presentation across different apparatus, of a particular item of characteristic content may be maintained in reference database 430.

According to other embodiments, items of reference content, including, without limitation, hashes of authentic characteristic content may be obtained by running trusted instances of counterparty applications (for example, counterparty application 335 in FIG. 3) on emulations (for example, virtual machines) of apparatus requesting authentication judgments and presenting data associated with characteristic content to authentication server 410. In such cases, the trusted instance of the counterparty application may create its own version of the characteristic content, which has been normalized using normalizing data (for example, data indicating a pixel density or "night mode" setting), and generate an item of reference content from the rendered characteristic content.

Figure 5A:
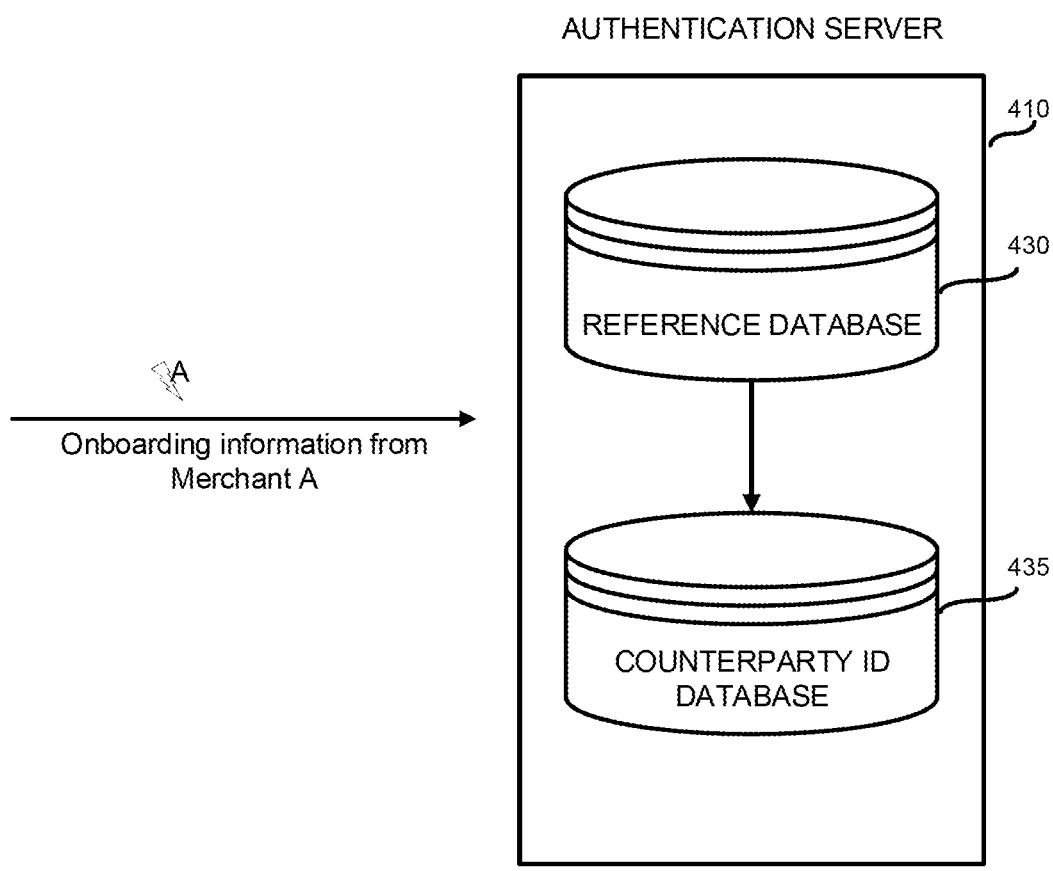
FIGS. 5A-5D illustrates an example of onboarding merchants with an authentication server according to certain embodiments of this disclosure.

FIGS. 5A-5D illustrate an exemplary visualization of onboarding merchants with the mobile payment service and generating the reference database and/or the counterparty ID database. In FIG. 5A, onboarding information may be received from a merchant (e.g., Merchant A as shown). The onboarding information may include aspects such as the merchant logo, the merchant name, other textual or graphical content describing the merchant needed for registration with the mobile payment service. In one embodiment, the onboarding information may be provided through a portal of the mobile payment service (e.g., a web portal accessed through the browser).

Figure 5B:
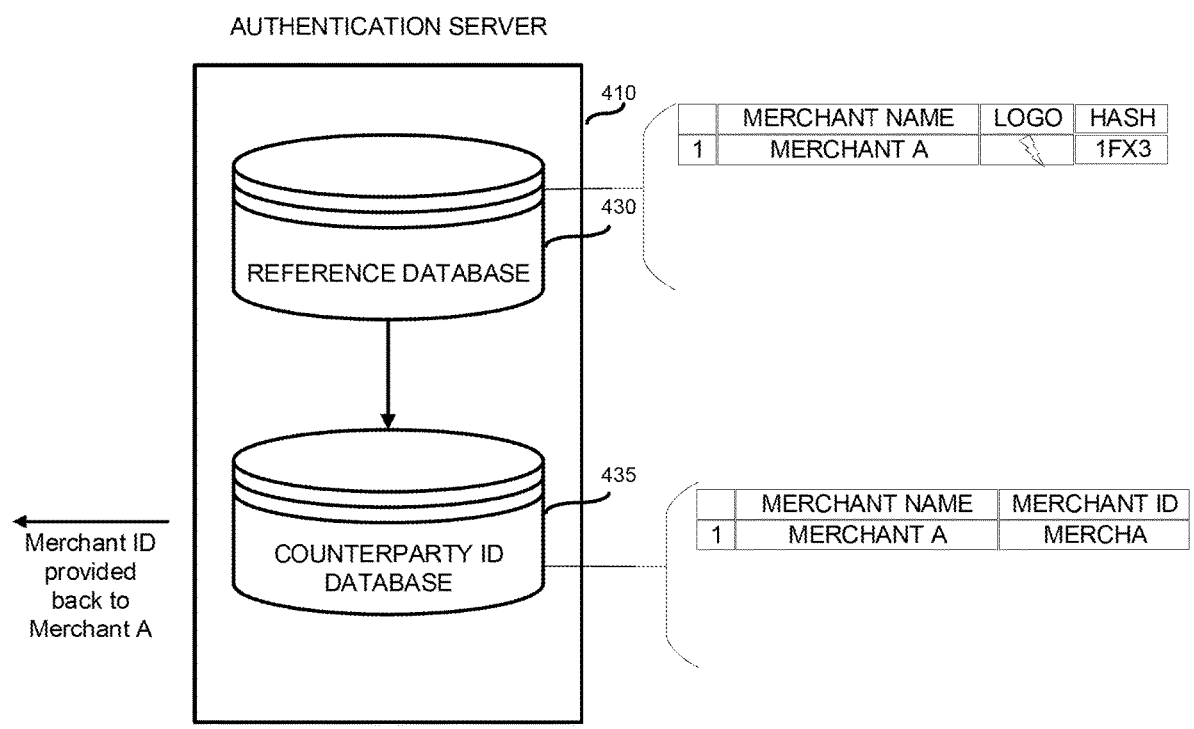

In FIG. 5B, the authentication server 410 may generate an entry in the database to associate the merchant name with the logo. In one embodiment, a hash of the logo can also be generated using a hashing algorithm as mentioned previously. The resulting hash may also be stored in the database associated with the merchant name. In an optional embodiment, the authentication server may compare the merchant name or merchant logo against well-known merchants to determine whether the registering merchant may be attempting to create a confusing situation for purchasers. For example, if a merchant is attempting to register as a merchant named "Amazom" and provides a similar logo as the company "Amazon", the authentication server can perform a comparison against well-known merchant names and logos, then subsequently prevent the registration from occurring. The comparison may also be made against other previously registered merchants. The logo comparison may be performed by a variety of techniques, including but not limited to: performing pixel matching/comparison if the logos are of the same resolution, using computer vision techniques to identify whether the images contain similar distinguishing features (e.g., the text contained, colors used, symbols shown, unique objects, blob detection, template matching, SURF feature extraction, etc.). Additionally, according to certain embodiments, the logo comparison may be performed programmatically, for example, by confirming the dimensions of the image, obtaining RGB values of both logo images, and calculating differences between color components across the two images and obtaining an overall metric of the differences between the RGB values. Once the reference content is stored in the reference database and associated with the merchant name, a merchant ID may be generated and stored either the same database or another database (e.g., counterparty ID database) which links the merchant ID with the merchant name. The generated merchant ID may then be provided back to the merchant to complete the onboarding process.

Figure 5C:
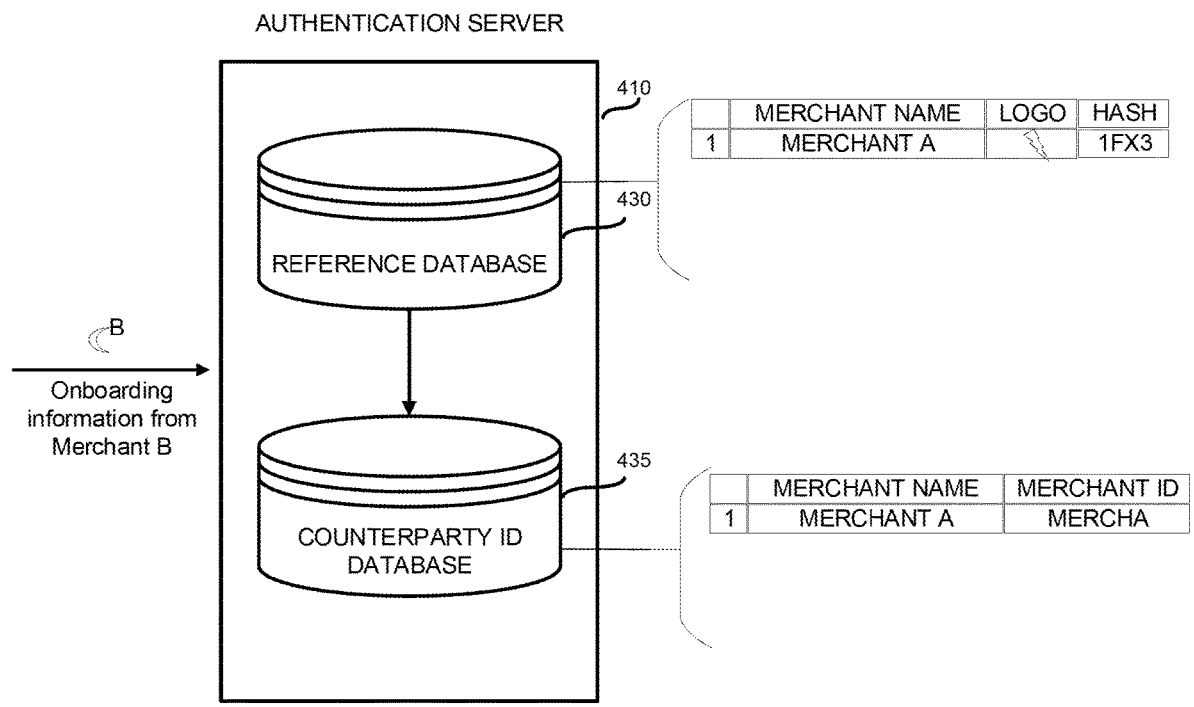
Figure 5D:
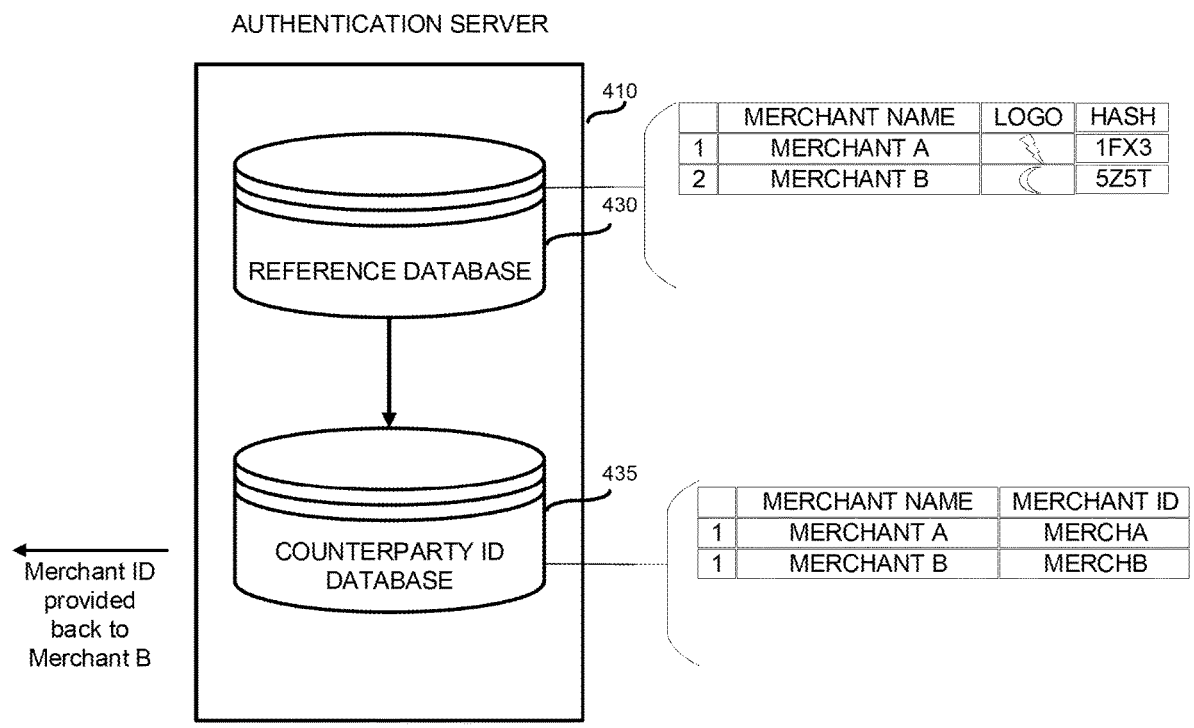

As shown in the non-limiting examples FIGS. 5C and 5D, the authentication server may onboard another merchant (e.g., Merchant B) using a similar process as described above in FIGS. 5A and 5B and provide the second merchant with the corresponding merchant ID.

FIG. 6 illustrates an example of apparatus-side operations of a method 500 for fraud detection according to various embodiments of this disclosure.

According to various embodiments, at operation 505, an apparatus (for example, device 100 in FIG. 1, or apparatus 305 in FIG. 3) obtains characteristic content from a counterparty to a digital transaction. In some embodiments, the characteristic content comprises content to be displayed on the apparatus (for example, through a TUI) in connection with a decisive point in a digital transaction (for example, a checkout or payment screen in an online purchase). Further, in the non-limiting example of FIG. 6, the obtained characteristic content comprises an image associated with the counterparty (such as a store logo), counterparty ID information (for example, the name of a vendor), or alphanumeric information to be rendered (if necessary) and displayed at the apparatus. According to certain embodiments, the characteristic content may be obtained from a counterparty server (for example, counterparty server 315 in FIG. 3) through a counterparty application installed and running on the apparatus. According to other embodiments, the characteristic content may be obtained through a different mechanism, such as via a text message, or through a website accessed via a browser application on the apparatus.

In some embodiments, method 500 comprises operation 510, wherein one or more items of characteristic content (for example, characteristic content received at the apparatus as .XML data) is rendered for viewing on the display of the apparatus. According to certain embodiments, at operation 510, the characteristic content is rendered for display according to settings and properties specific to the apparatus, such as, for example, screen resolution and brightness settings). In some embodiments, at operation 510, the characteristic content is rendered and displayed for a brief interval, so that a snapshot of the rendered characteristic content may be taken at the terminal. In some embodiments, the rendering may be done according to designated resolutions or settings to ensure consistency of the obtained snapshot. In some embodiments, operation 510 is omitted, and the data associated with characteristic content provided to the authentication server does not include content to be rendered at the apparatus.

According to certain embodiments, at operation 515, an apparatus may generate a hash of one or more items of characteristic content, such as characteristic content obtained at operation 505 in a display-ready format (for example, an image file). According to some embodiments, the apparatus may generate a hash of some or all of a snapshot of content rendered at operation 510. In the non-limiting example of FIG. 6, hashes generated at operation 515 can be sent to an authentication server (for example, authentication server 200 in FIG. 2) as data associated with characteristic content. In other embodiments, operation 515 may be omitted, and the hash of the item of characteristic content may be generated at the authentication server based on data sent to the authentication server at operation 520 or another comparison method may be used without generating a hash.

In one embodiment, as a non-limiting example of FIG. 6, the characteristic content may be a logo of the counterparty, which is provided to the apparatus from the counterparty. The apparatus may be configured to use the logo both to display on the apparatus screen and provide the logo as characteristic content (either as an image file or as a hash which was generated from the logo by the apparatus) to the authentication server.

In another embodiment, the apparatus may be configured to display a different image from the characteristic content that is provided to the authentication server or a party attempting to commit fraud may cause a different image to be provided as characteristic content from the image displayed. For example, a merchant intent on committing fraud may provide a logo of a reputable company (e.g., Amazon, Walmart, Target, Macy's, etc.) for display but cause its own logo to be provided as characteristic content so as to have a matching comparison with the reference. In such an embodiment, the apparatus may provide to the authentication server the snapshot of the content rendered for display or portions of the snapshot where the logo or other aspects, such as price are located.

As shown in the non-limiting example of FIG. 6, at operation 520, data associated with the characteristic content is sent (for example, via a 3G wireless network) to an authentication server. According to some embodiments, at operation 520, the data associated with the characteristic content is sent along with a request (such as the API call 700 shown in FIG. 8A of this disclosure) that the authentication server perform an authentication judgment.

In various embodiments according to this disclosure, at operation 525, the apparatus obtains, from the authentication server, the result of an authentication judgment based on data associated with the characteristic content and a a reference item of content. The format of the result of the authentication judgment received by the apparatus at operation 525 can vary across embodiments according to this disclosure. In some embodiments, the result of the authentication judgment may comprise an indicator, such as a flag as to whether a comparison based on data associated with characteristic content provided by the apparatus to the authentication server matches an item of reference content stored at the authentication server. According to other embodiments, the result of the authentication judgment may comprise the value of a counterparty ID associated with an item of reference content with a matching comparison of the data associated with characteristic content provided by the apparatus to the authentication server. In some further embodiments, the result of the authentication judgment provided in operation 520 may comprise an authorization, such as authorization to generate or release a payload (for example, a payload of payment framework 350 in FIG. 3). According to other embodiments, the result of the authentication judgment may comprise a warning to be displayed to the user, advising of an inability to verify the counterparty to the digital transaction.

In one embodiment, as a non-limiting example of FIG. 6, a counterparty (indicated herein as Merchant C for the purposes of this example) aiming to commit fraud may provide the logo of a reputable merchant (indicated herein as Merchant A for the purpose of this example) to the apparatus along with its own merchant ID (e.g., MerchC). The aim of Merchant C would be to obtain a matching comparison for the reputable Merchant A, but to have payment provided to Merchant C. In such an exemplary scenario, while the authentication server may obtain a match from comparing the provided logo of Merchant A with the logo stored in the reference database, the authentication server will then compare the provided merchant ID with the reference merchant ID (e.g., MerchC with MerchA) which will result in a lack of a match. In one embodiment, an indicator showing that the merchant IDs failed to match may be provided to the apparatus which may lead to the display of a notification and requiring further user confirmation to continue. In another embodiment, the mismatch of merchant IDs may result in the transaction being halted and a notification provided to the apparatus for display to indicate the reason for the transaction being stopped. In another embodiment, the merchant ID which is associated with the matching logo (e.g., MerchA) is provided to the apparatus so a payload can be generated to provide payment to Merchant A. Such a payment would not be completed as Merchant A would have no record of the order and cancel the transaction. In another embodiment, the authentication server may also keep a record of the merchants which have non-matching characteristic content. If a merchant (e.g., Merchant C) has multiple instances of non-matching comparisons, it may be removed from participating in the mobile payment service and any future transaction requests would be blocked.

In some embodiments, operation 530 comprises determining, by the apparatus whether to proceed with a digital transaction based on the received result of the authentication judgment. According to certain embodiments, operation 530 comprises application of a rule stored at the apparatus to a value contained in the result obtained at operation 525. For example, if the apparatus receives an indication that the data associated with an item of characteristic content cannot be matched to an item of reference content stored at the authentication server.

It should be noted that FIG. 6 provides an example of certain embodiments of a method 500 according to this disclosure. Other embodiments, in which operations are added or subtracted from those shown in FIG. 6 are possible and within the scope of this disclosure. For example, in embodiments in which the data associated with the characteristic content provided to the authentication server is an image upon which a hash is generated by the authentication server or another method of comparison is used, operations 510 and 515 may be omitted.

Figure 7:
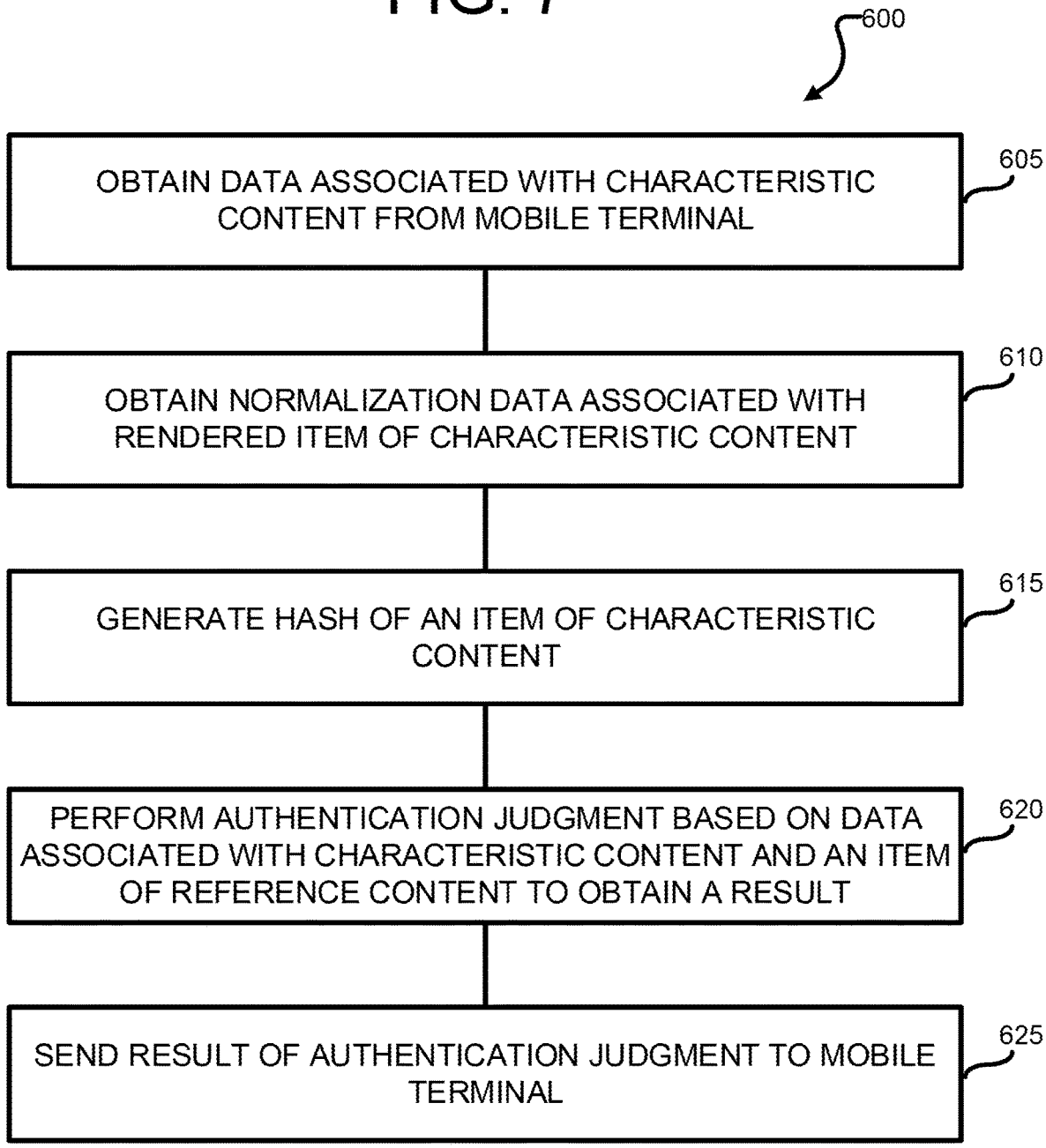
FIG. 7 illustrates an example of authentication server-side operations of a method for fraud detection according to some embodiments of this disclosure.

FIG. 7 illustrates authentication-server side operations of a method 600 for fraud detection according to certain embodiments of this disclosure.

Referring to the non-limiting example of FIG. 7, at operation 605, an authentication server (for example, authentication server 410 in FIG. 4) obtains, from an apparatus (for example a mobile terminal or device 100 in FIG. 1), data associated with characteristic content. According to certain embodiments, the authentication server may obtain the data associated with characteristic content as part of an API call (for example a request for an authentication judgment) by the apparatus. In the non-limiting example of FIG. 7, the data associated with the characteristic content can include, without limitation, an image for display on the apparatus, alphanumeric content to be rendered and displayed at the apparatus, for example a price or quantity, and counterparty information (for example, the counterparty ID for a digital transaction provided to the apparatus). In some embodiments, data associated with an item of characteristic content comprises a hash of the item.

According to some embodiments, at operation 610, the authentication server obtains normalization data associated with an item of characteristic content. In the non-limiting example of FIG. 7, normalization data includes, without limitation, data reflecting apparatus-specific parameters (for example, a brightness setting or screen resolution) affecting how the content is rendered at the apparatus from which the authentication server obtains data associated with the item of characteristic content.

In various embodiments according to this disclosure, at operation 615, the authentication server generates a hash of the data associated with characteristic content by applying a hash function (for example, SHA256, MD4, or other hash algorithm) to the data. In some cases, for example, where the data associated with the characteristic content comprises a snapshot of data as rendered for display at an apparatus, the authentication server may, prior to generating a hash, normalize the data to account for apparatus-specific parameters affecting the display of the characteristic content. Such normalization may be performed using normalization data obtained at operation 610. In some embodiments, operation 615 may be optional if the hash is provided as part of the characteristic content from the apparatus or another form of comparison is used to perform the authentication judgment.

According to some embodiments, at operation 620, the authentication server performs an authentication judgment based on data associated with an item of characteristic content and an item of reference content. In some embodiments, the data associated with the item of characteristic content is itself a hash, and the authentication judgment comprises a query to determine if data associated with the item of characteristic content matches an item of reference content maintained in a reference database (for example, reference database 430 in FIG. 4). Additionally, if a match to an entry in a reference database is found, operation 620 may comprise a further database lookup operation (for example, in counterparty ID database 435 in FIG. 4) to determine a counterparty ID value associated with the matched reference item of content. In another embodiment, the performance of an authentication judgment may be a comparison of a reference logo with the logo provided as part of the characteristic content or extracted from the snapshot. Examples of such a comparison may include, without limitation, performing pixel matching/comparison if the logos are of the same resolution, using computer vision techniques to identify whether the images contain similar distinguishing features (e.g., the text contained, colors used, symbols shown, unique objects, blob detection, template matching, SURF feature extraction, etc.).

According to other embodiments, at operation 620, the authentication server generates an item of reference content by generating a snapshot of the characteristic content on a trusted instance of a counterparty application on a device emulating the display properties of the apparatus. In some embodiments, an emulation of the display properties of the apparatus may be created using normalization data obtained by the authentication server, such as during operation 610. In such embodiments, a comparison of a hash of the data associated with the item of characteristic content may be compared against an item of reference content based on the trusted instance of the counterparty application. If there is a match, the generated hash may be stored as an item of reference content in a reference database, along with the normalization settings.

In one embodiment, for the non-limiting example of FIG. 7, the apparatus may provide as characteristic content to the authentication server, a snapshot of displayed content, portions of a snapshot of displayed content (e.g., locations of a merchant logo, transaction amount, etc.), or a hash of those portions of a snapshot. The apparatus may also provide other characteristic content data such as a numerical transaction amount, counterparty ID, normalization data, etc. The authentication server may then emulate the display of the device using a virtual machine and the parameters of the normalization data to obtain a similar snapshot image or extract the portions of a snapshot to perform a comparison with the received characteristic data. This can allow the server to check whether the data provided for display may match the data to be provided for payment. For example, a merchant intending to commit fraud may provide one amount (e.g., $100) to a display module for displaying on a screen, but a different amount (e.g., $1000) to a payment module. In the event of a mismatch, the authentication server may perform various actions including stopping the transaction, notifying the apparatus, etc.

According to certain embodiments, as part of operation 620, the authentication server may apply a predetermined rule based on the outcome of the query for a matching item of reference content to obtain a result for the authentication judgment. For example, if no match is found, the authentication server may apply a rule to generate a "permission denied" message to send to the apparatus, instructing the apparatus not to proceed with the digital transaction.

In the non-limiting example of FIG. 7, at operation 625, the authentication server sends the result of the authentication judgment to the apparatus. According to certain embodiments, the result may be sent as API call responding to a request for an authentication judgment.

Figure 8A:
FIG. 8A illustrates an example of an application programming interface (API) call for requesting an authentication judgment from an authentication server according to some embodiments of this disclosure.

FIG. 8A illustrates an example of an application programming interface (API) call 700 for requesting an authentication judgment from an authentication server according to some embodiments of this disclosure.

Referring to the non-limiting example of FIG. 8A, API call 700 comprises a "post" to an authentication server (for example, authentication server 410 in FIG. 4). According to certain embodiments, API call 700 may be generated by a payment framework running on a device (for example, payment framework 350 in FIG. 3). API call 700 includes an instance 705 of the method "request," by which the apparatus requests an authentication judgment from the authentication server. An instance 710 of the method "audit" may be included within instance 705 of the method "request." The arguments of the method "request" may comprise data associated with characteristic content.

FIG. 8B illustrates an example of data 720 associated with characteristic content as provided in an API call for requesting an authentication judgment from an authentication server, according to certain embodiments of this disclosure. According to certain embodiments, data associated with characteristic content may be provided as arguments of the attribute "secureDatas" shown in FIG. 8A. Referring to the non-limiting example of FIG. 8B, data 720 associated with characteristic content comprises normalization data 725, content to be rendered 730 and one or more hashes of characteristic content 735 generated at the apparatus. According to certain embodiments, normalization data 725 includes, without limitation, data specifying the location of characteristic content in a display, the resolution of a display, the pixel density of a display, text attributes, such as font style and size, and background colors. In some embodiments, content to be rendered 730 includes, without limitation, the name of a counterparty (for example, a Merchant ID or Merchant name), a transaction amount and an express checkout ("ECO") label.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for authenticating a counterparty machine to a digital transaction in order to prevent fraudulent manipulation of content displayed to a user, the method comprising:
obtaining, at a mobile terminal from the counterparty machine via an indirect connection over a network, characteristic content associated with the digital transaction, wherein the characteristic content is to be displayed in a trusted user interface (TUI) provided by the mobile terminal, wherein the TUI displays content associated with a counterparty application executing on the mobile terminal, and wherein the digital transaction comprises accessing a sensitive resource of the mobile terminal maintained in a trusted execution environment (TEE);
sending, by the mobile terminal via the network, data associated with the characteristic content and normalization data to an authentication server that executes a virtual machine configured to generate an emulation of a reference item of content as displayed at the mobile terminal based on the normalization data; and
obtaining, from the authentication server via the network, a result of an authentication judgment by the authentication server, the authentication judgment based on a comparison between the data associated with the characteristic content and the emulation of the reference item of content,
wherein the characteristic content comprises an image as rendered at the mobile terminal, wherein the image is associated with at least one of a counterparty, counterparty identification (ID) information, or alphanumeric information to be displayed in the TUI, and
wherein the normalization data comprises data specifying a value of at least one parameter associated with rendering the characteristic content at the mobile terminal.

2. The method of claim 1, wherein the data associated with the characteristic content comprises item display data.

3. The method of claim 1, wherein the data associated with the characteristic content comprises a hash of an item of characteristic content.

4. The method of claim 3, wherein the hash of the item of characteristic content is generated at the authentication server.

5. The method of claim 1, further comprising:
determining, by the mobile terminal, whether to proceed with the digital transaction based on the result of the authentication judgment.

6. A method for authenticating a counterparty machine to a digital transaction in order to prevent fraudulent manipulation of content displayed to a user, the method comprising:
obtaining, at an authentication server from a mobile terminal via an indirect connection over a network, data associated with characteristic content of a counterparty and normalization data, wherein the characteristic content is to be displayed in a trusted user interface (TUI) provided by the mobile terminal, wherein the TUI displays content associated with a counterparty application executing on the mobile terminal, and wherein the digital transaction comprises accessing a sensitive resource of the mobile terminal maintained in a trusted execution environment (TEE);
generating, by a virtual machine executing at the authentication server, an emulation of a reference item of content as displayed at the mobile terminal based on the normalization data;
performing, by the authentication server, an authentication judgment based on a comparison between the data associated with the characteristic content and the emulation of the reference item of content to obtain a result; and
sending, by the authentication server via the network, the result of the authentication judgment to the mobile terminal,
wherein the characteristic content comprises an image as rendered at the mobile terminal, wherein the image is associated with at least one of the counterparty, counterparty identification (ID) information, or alphanumeric information to be displayed in the TUI, and
wherein the normalization data comprises data specifying a value of at least one parameter associated with rendering the characteristic content at the mobile terminal.

7. The method of claim 6, wherein performing the authentication judgment comprises generating, as the reference item of content, a hash of the data associated with the characteristic content of the counterparty.

8. The method of claim 6, wherein the data associated with the characteristic content of the counterparty comprises a hash.

9. The method of claim 6, wherein the data associated with the characteristic content comprises data generated from rendering an item of characteristic content for display at the mobile terminal.

10. The method of claim 6, further comprising:
registering, by the authentication server, a reference image associated with the counterparty;
generating the reference item of content from the reference image; and
associating the reference item of content with the counterparty ID information.

11. An apparatus for preventing fraudulent manipulation of content displayed to a user, the apparatus comprising:
a display;
a network interface;
a processor; and
a memory containing instructions that, when executed by the processor, cause the apparatus to:
obtain, from a counterparty machine via an indirect connection over a network using the network interface, characteristic content associated with a digital transaction, wherein the characteristic content is to be displayed on the display in a trusted user interface (TUI) provided by the apparatus, wherein the TUI is configured to display content associated with a counterparty application executing on the apparatus, and wherein the digital transaction comprises accessing a sensitive resource of the apparatus maintained in a trusted execution environment (TEE),
send, via the network using the network interface, data associated with the characteristic content and normalization data to an authentication server that is configured to execute a virtual machine configured to generate an emulation of a reference item of content as displayed at the apparatus based on the normalization data, and obtain, from the authentication server via the network using the network interface, a result of an authentication judgment by the authentication server, the authentication judgment based on a comparison between the data associated with the characteristic content and the emulation of the reference item of content, wherein the characteristic content comprises an image as rendered at the apparatus, wherein the image is associated with at least one of a counterparty, counterparty identification (ID) information, or alphanumeric information to be displayed in the TUI, and wherein the normalization data comprises data specifying a value of at least one parameter associated with rendering the characteristic content at the apparatus.

12. The apparatus of claim 11, wherein the data associated with the characteristic content comprises item display data.

13. The apparatus of claim 11, wherein the data associated with the characteristic content comprises a hash of an item of characteristic content.

14. The apparatus of claim 13, wherein the memory contains instructions that, when executed by the processor, cause the apparatus to receive the hash of the item of characteristic content from the authentication server.

15. The apparatus of claim 11, wherein the memory further contains instructions that, when executed by the processor, cause the apparatus to:
determine whether to proceed with the digital transaction based on the result of the authentication judgment.

16. An authentication server for preventing fraudulent manipulation of content displayed to a user, the authentication server comprising:
a network interface;
a processor; and
a memory containing instructions that, when executed by the processor, cause the authentication server to:
obtain, from a mobile terminal via an indirect connection over a network using the network interface, data associated with characteristic content of a counterparty to a digital transaction and normalization data, wherein the characteristic content is to be displayed in a trusted user interface (TUI) provided by the mobile terminal, wherein the TUI displays content associated with a counterparty application executing on the mobile terminal, and wherein the digital transaction comprises accessing a sensitive resource of the mobile terminal maintained in a trusted execution environment (TEE),
generate, by a virtual machine executing at the authentication server, an emulation of a reference item of content as displayed at the mobile terminal based on the normalization data,
perform an authentication judgment based on a comparison between the data associated with the characteristic content and the emulation of the reference item of content to obtain a result, and
send, via the network using the network interface, the result of the authentication judgment to the mobile terminal, wherein the characteristic content comprises an image as rendered at the mobile terminal, wherein the image is associated with at least one of the counterparty, counterparty identification (ID) information, or alphanumeric information to be displayed in the TUI, and wherein the normalization data comprises data specifying a value of at least one parameter associated with rendering the characteristic content at the mobile terminal.

17. The authentication server of claim 16, wherein the memory further contains instructions that, when executed by the processor, cause the authentication server to:
generate a hash of the data associated with the characteristic content of the counterparty as part of performing the authentication judgment.

18. The authentication server of claim 16, wherein the data associated with the characteristic content of the counterparty comprises a hash.

19. The authentication server of claim 16, wherein the data associated with the characteristic content comprises data generated from rendering an item of characteristic content for display at the mobile terminal.

20. The authentication server of claim 16, wherein the memory further contains instructions that, when executed by the processor, cause the authentication server to:
register a reference image associated with the counterparty;
generate the reference item of content from the reference image; and
associate the reference item of content with the counterparty ID information.

21. A non-transitory computer-readable medium comprising program code for preventing fraudulent manipulation of content displayed to a user, wherein the program code when executed by a processor causes an apparatus to:
obtain, from a counterparty machine via an indirect connection over a network using a network interface, characteristic content associated with a digital transaction, wherein the characteristic content is to be displayed on a display in a trusted user interface (TUI) provided by the apparatus, wherein the TUI is configured to display content associated with a counterparty application executing on the apparatus, and wherein the digital transaction comprises accessing a sensitive resource of the apparatus maintained in a trusted execution environment (TEE);
send, via the network using the network interface, data associated with the characteristic content and normalization data to an authentication server that is configured to execute a virtual machine configured to generate an emulation of a reference item of content as displayed at the apparatus based on the normalization data; and
obtain, from the authentication server via the network using the network interface, a result of an authentication judgment by the authentication server, the authentication judgment based on a comparison between the data associated with the characteristic content and the emulation of the reference item of content, wherein the characteristic content comprises an image as rendered at the apparatus, wherein the image is associated with at least one of a counterparty, counterparty identification (ID) information, or alphanumeric information to be displayed in the TUI, and wherein the normalization data comprises data specifying a value of at least one parameter associated with rendering the characteristic content at the apparatus.

22. The non-transitory computer-readable medium of claim 21, wherein the data associated with the characteristic content comprises item display data.

23. The non-transitory computer-readable medium of claim 21, wherein the data associated with the characteristic content comprises a hash of an item of characteristic content.

24. The non-transitory computer-readable medium of claim 23, further comprising program code that, when executed by the processor, causes the apparatus to receive the hash of the item of characteristic content from the authentication server.

25. The non-transitory computer-readable medium of claim 21, further comprising program code that, when executed by the processor, causes the apparatus to:
determine whether to proceed with the digital transaction based on the result of the authentication judgment.

26. A non-transitory computer-readable medium comprising program code for preventing fraudulent manipulation of content displayed to a user, wherein the program code when executed by a processor causes an authentication server to:
obtain, from a mobile terminal via an indirect connection over a network, data associated with characteristic content of a counterparty to a digital transaction and normalization data, wherein the characteristic content is to be displayed in a trusted user interface (TUI) provided by the mobile terminal, wherein the TUI displays content associated with a counterparty application executing on the mobile terminal, and wherein the digital transaction comprises accessing a sensitive resource of the mobile terminal maintained in a trusted execution environment (TEE);
generate, by a virtual machine executing at the authentication server, an emulation of a reference item of content as displayed at the mobile terminal based on the normalization data;
perform an authentication judgment based on a comparison between the data associated with the characteristic content and the emulation of the reference item of content to obtain a result; and
send, via the network, the result of the authentication judgment to the mobile terminal,
wherein the characteristic content comprises an image as rendered at the mobile terminal, wherein the image is associated with at least one of the counterparty, counterparty identification (ID) information, or alphanumeric information to be displayed in the TUI, and
wherein the normalization data comprises data specifying a value of at least one parameter associated with rendering the characteristic content at the mobile terminal.

27. The non-transitory computer-readable medium of claim 26, further comprising program code that, when executed by the processor, causes the authentication server to:
generate a hash of the data associated with the characteristic content of the counterparty.

28. The non-transitory computer-readable medium of claim 26, wherein the data associated with the characteristic content of the counterparty comprises a hash.

29. The non-transitory computer-readable medium of claim 26, wherein the data associated with the characteristic content comprises data generated from rendering an item of characteristic content for display at the mobile terminal.

30. The non-transitory computer-readable medium of claim 26, further comprising program code that, when executed by the processor, causes the authentication server to:
register a reference image associated with the counterparty;
generate the reference item of content from the reference image; and
associate the reference item of content with the counterparty ID information.

* * * * *